US005477250A

United States Patent [19]

Larson

[11] Patent Number: 5,477,250

[45] Date of Patent: Dec. 19, 1995

[54] DEVICE EMPLOYING MULTICOLOR TONER PARTICLES FOR GENERATING MULTICOLOR IMAGES

[75] Inventor: Ove Larson, Vastra Frolunda, Sweden

[73] Assignee: Array Printers AB, Sweden

[21] Appl. No.: 152,982

[22] Filed: Nov. 15, 1993

[30] Foreign Application Priority Data

Nov. 13, 1992 [SE] Sweden .................................. 9203392

[51] Int. Cl.[6] .................................................. G01D 15/06

[52] U.S. Cl. ................................................................ 347/55

[58] Field of Search .................................... 355/261–265, 355/326, 327; 118/645, 647–651; 346/153.1, 155, 157, 159; 347/55

[56] References Cited

U.S. PATENT DOCUMENTS

| | | | |
|---|---|---|---|
| 5,121,144 | 6/1992 | Larson et al. | 346/155 X |
| 5,235,354 | 8/1993 | Larson | 346/155 X |
| 5,283,594 | 2/1994 | Iwao | 346/159 |
| 5,305,026 | 4/1994 | Kazuo et al. | 346/159 |

*Primary Examiner*—William J. Royer

*Attorney, Agent, or Firm*—Ostrolenk, Faber, Gerb & Soffen

[57] ABSTRACT

Device for generating multicolor images which employs a latent electric charge pattern and development of this on an information carrier (21) using toner particles (16) of different colors. Separate developers (10–13) are used for each color. Each developer (10–13) is individually provided with a toner carrier, preferably a conductive developer roll (14) and a back electrode (23) which cooperates with the developer roll by attraction forces. An electrode unit (29) is arranged between the conductive developer roll and the back electrode 23. The electrode unit (29) includes at least one electrode layer/direction (22), essentially including relative parallel electrodes, which are common for all developers (10–13), and a plurality of apertures (27). The apertures (27) are opened and closed respectively by signals from at least one driving device (25). The toner carriers (14) and/or the back electrode/electrodes (23) is/are arranged to have applied a potential difference with respect to the colour selection, which results in attraction forces between the toner carrier (14) and the back electrode (23). A possible second electrode layer/direction (33), which includes electrodes (33) which are essentially parallel and formed at an angle to the first electrode layer (22), is provided to be controlled individually by at least a second driving device (31).

22 Claims, 8 Drawing Sheets

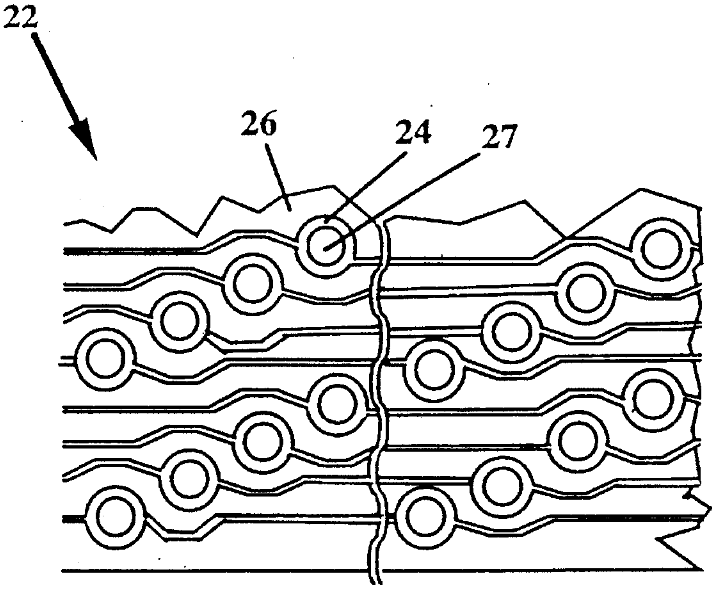
Fig. 4
FIG. 7
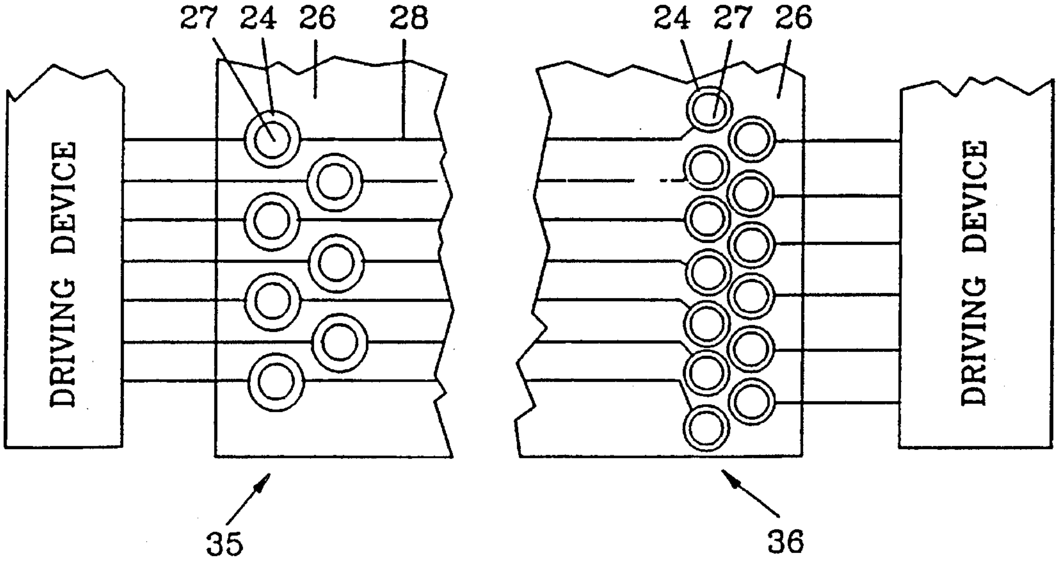

DEVICE EMPLOYING MULTICOLOR TONER PARTICLES FOR GENERATING MULTICOLOR IMAGES

The present invention relates to a device for presenting multicolour images, by means of a latent electric charge pattern and development of this on an information carrier by means of toner particles of different colours, by using separate developers for each colour, each developer is arranged with a toner carrier, preferably a developer roller cooperative with a back electrode by means of attraction forces as well as an electrode means arranged between these, provided with pervious apertures which are opened and closed respectively by means of signals from at least one control device.

BACKGROUND OF THE INVENTION

The present invention is a further development of the method and device described in Swedish patent 8704883 for development of images and text by means of monochromatic toner particles on an information carrier, by using computer generated signals. According to the patent an information carrier, for example paper, is brought in electric cooperation with at least one screen or lattice-shaped electrode means, which through control in accordance to the desired pattern configuration opens and closes passages through an electrode matrix, by galvanic connection of the electrodes of the matrix to at least one voltage supply. Through consequently opened passages, an electric field is exposed for attracting the toner particles towards the information carrier. Further, through the international patent application PCT/SE90/00398 it is known, that the electrode matrix consists of a weave, where the weave wires consist of electrodes and where each mesh is surrounded by double electrodes. Through SE-90000631 it is known that a back electrode can be screen-shaped, ie. divided in a number of individual electrodes, and placed in front of the meshes of the electrode matrix.

THE OBJECT AND THE IMPORTANT FEATURES OF THE INVENTION

The object of the invention is to provide a device of the above described type, which gives high quality multicolour prints by means of a constructive simple and thereby a cheap device. These tasks have been solved by means of an electrode means including at least one electrode layer, essentially including relative parallel electrodes, which are common for all developers; that the toner carriers and/or the back electrode(s) is (are) arranged to have applied, with respect to the colour selection, with a potential difference, which results in attraction forces between the toner carrier and the back electrode; and/or that another electrode layer including essentially parallel electrodes forming an angle to the electrodes of the first electrode layer is provided to be controlled individual by at least a second driving device.

SPECIFICATION OF THE DRAWINGS

The invention will be described more detailed below with reference to embodiments shown on the attached drawings.

FIG. 1 discloses schematically a cross-section of a device according to the invention.

FIG. 2 reveals the developer in FIG. 1 in perspective and in an enlarged scale.

FIG. 3 discloses a magnification of the encircled details in FIG. 2.

FIG. 4 discloses an embodiment on a part of an electrode means.

FIG. 5 discloses a second embodiment of the device according to the invention.

FIG. **5*a* shows, in perspective a detail enlargement of that encircled area in FIG. 5**.

FIG. 6 illustrates a third embodiment of the device according to the invention.

FIG. **6*a* discloses, in perspective a detail enlargement of the encircled area in FIG. 6**.

FIG. 7 discloses another embodiment of the electrode means shown in FIG. 4.

FIG. 8 discloses in perspective a view of developers, developer cartridge and the paper sheet carrier/cleaning device.

DESCRIPTION OF THE EMBODIMENTS

Figure 1:
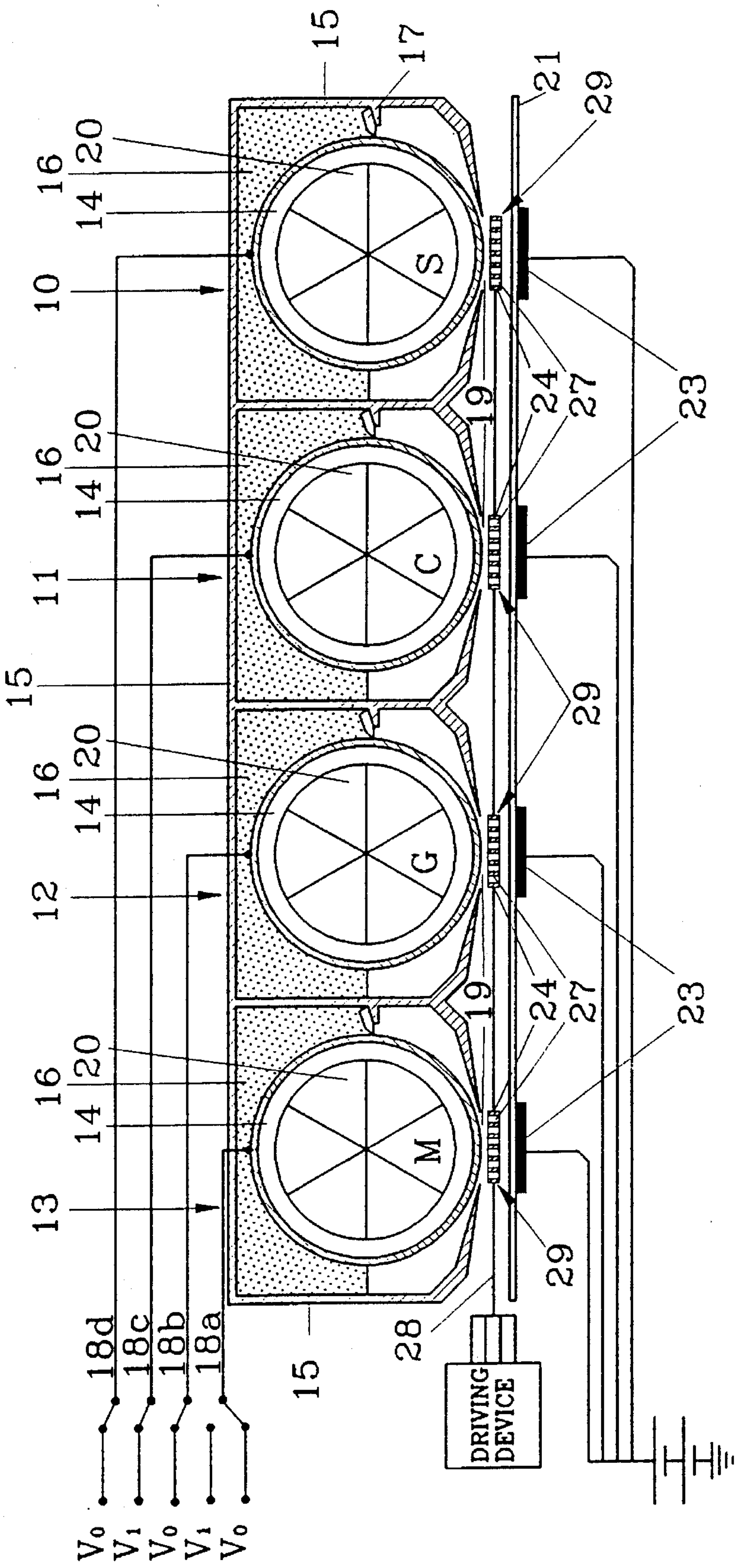
Figure 2:
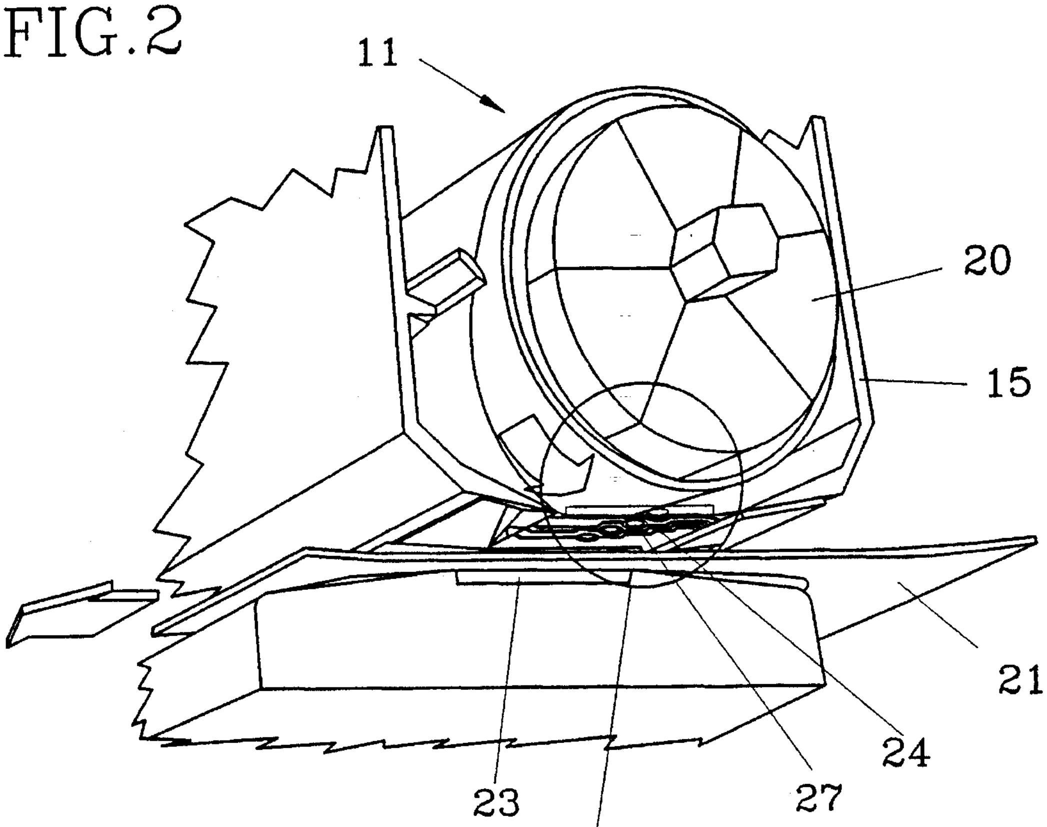
Figure 3:
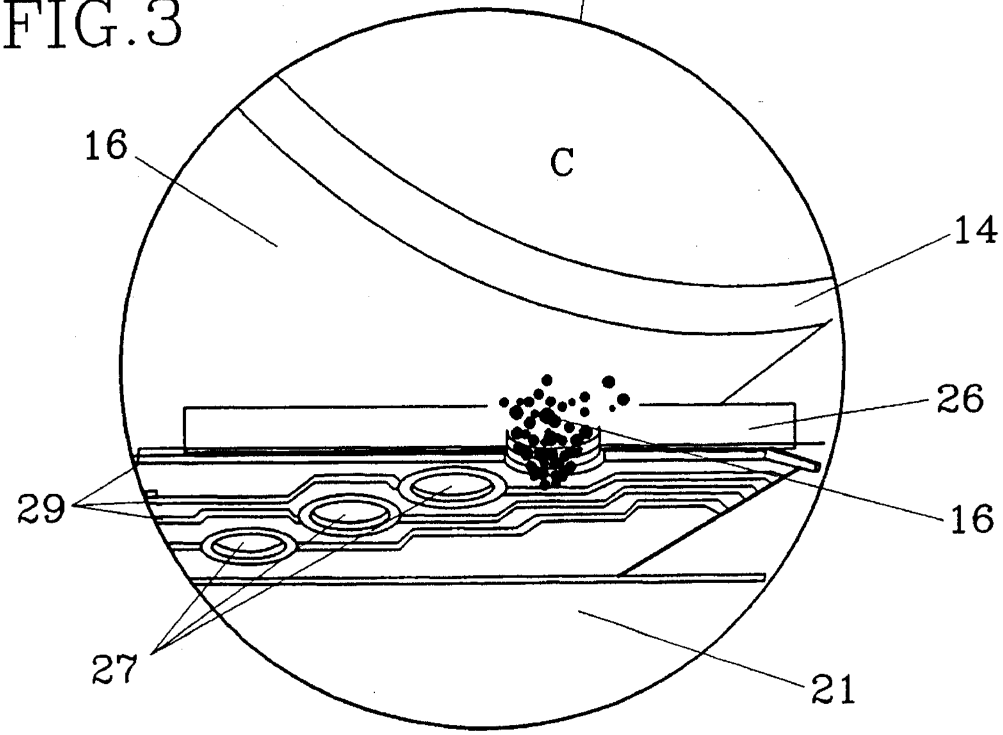

FIGS. 2 and 3 show a device consisting of a number, for instance four, separate developers 10–13, each including a toner carrier 14, preferably a conductive developer roller and a container 15 for toner particles 16, even called toner. Each developer contains a colour, for instance magenta, cyan, yellow and black (M, C, G and B). A special scrape device 17, so-called "doctor blade" is provided to produce a uniform layer of toner particles 16 on the toner carrier 14. Each toner carrier 14 includes a core, consisting of a number of permanent magnets 20 with different polarity. These are provided to attract the toner particles 16 to the roller 14. Each of these rollers is individually connectable to a voltage supply by means of switches **18*a*–18*d*, which means that the toner carriers 14 can be supplied by different potentials. The toner particles 16 are transferred to an information carrier 21, which can be a paper sheet, via an opening 19, arranged in the toner container 15, facing the information carrier 21. The transfer occurs by means of attraction forces, which are produced between the toner carrier 14 and at least a back electrode 23. An electrode means 29, consisting of a lattice-shaped electrode layer 22 is arranged between the toner carriers 14 and the back electrodes 23. In this embodiment the electrode layer 22 consists of electrodes 24 of thin conductors, according to FIG. 4, supported on an insulating carrier 26, in which the conductor and the carrier are provided with pervious apertures 27, to act as passages for said attraction forces. The electrodes 24 in the electrode layer are common for all developers 10–13 and connected to a driving device 25**.

In the shown embodiment, the switching unit **18*b* is connected to $V_1$ (=330), whereby only one toner carrier 14 with one type of toner particles 16, ie. cyan, receives necessary potential, so that the electric field attracts the particles from the toner carrier 14 to the information carrier 21. By means of the signals from the driving device 25, the electrodes 24 are controlled, so that passages for the attraction force in the apertures 27 are opened or closed between the back electrode 23 and the toner carrier 14. By bringing an information carrier 21, eg. a paper sheet, between the developer 10–13 and the back electrodes 23, cyan toner particles 16 are transported on the information carrier 21. In FIG. 3 the embodiment is elucidated, where cyan is transported from the toner carrier 14 to the information carrier 21, whereby the switch 18 for the cyan developer is connected to $V_1$. By connecting the electrodes 24 to different voltages, henceforth called ON or OFF-voltage, the toner particles 16 are guided to the information carrier 21. An ON-voltage is a voltage resulting that an "opening" is obtained in the electrode apertures 27 and that the attraction force between the back electrodes 23 and to $V_1$ connected toner carrier 14 causing toners to be applied on the information carrier, while an OFF-voltage prevents the attraction force to reach the toner particles. Through the remaining electrode apertures appurtenant to the developers, which are provided on same signal line 28, according to FIG. 4, connected to the ON-voltage, no toners pass when non sufficient field strength is obtained between the developer, connected to $V_0$(=for example 0V), and the back electrodes 23. A connection of the electrode 24 to an ON-voltage, results in cyan being transported to the information carrier. Pervious apertures 27 in electrodes 24, which are not connected to the same signal line 28 of driving device 25, are "closed" by means of OFF-voltage. This is also applied for the remaining electrode apertures belonging to the other developers, which are provided on the same signal line 28**.

Figures 5, 5A:
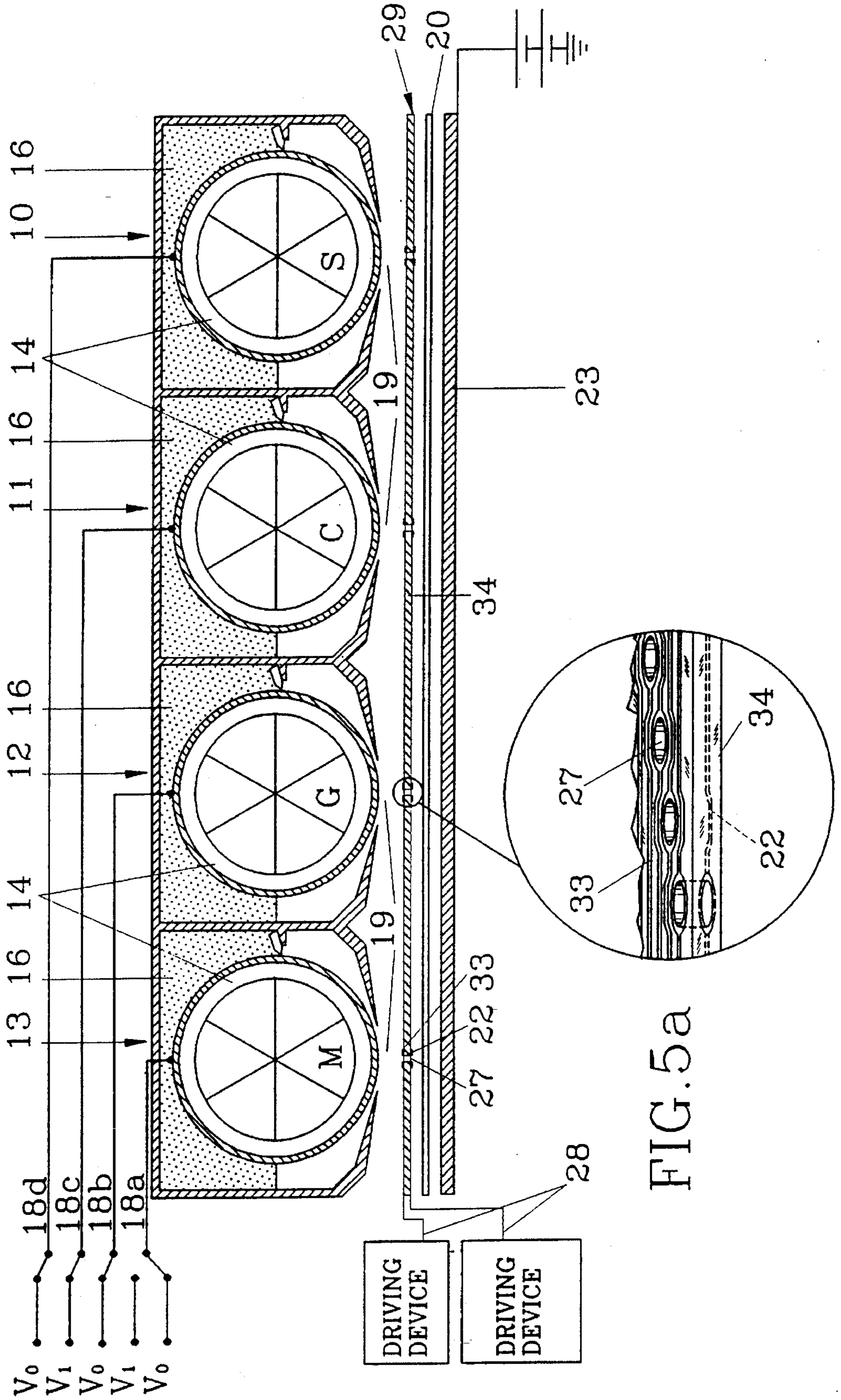

"Electrographic printing" particles are used in an embodiment according to FIGS. 5 and 5*a*. In this case the electrode matrix is substituted by a "particle modulator", which consists of slit-formed apertures 27 arranged on an insulating plate 34, adjacent to which is a first electrode layer 22, so-called signal electrodes, on one side of the plate and another electrode layer 33, so-called base electrodes on the other side of the plate. Consequently, the electrodes 22 and 33 are outdistanced by means of the plate 34. According to this principle, if the toner particles 16 have negative (–) charge, the signal electrode 22 is connected to a positive (+) voltage by means of the driving devices 25 and the driving device 31 connects the base electrode to a negative (–) voltage, while the back electrode 23 is connected to a positive voltage. This causes an attraction force between the back electrode 23 and the toner carrier 14, with direction towards the back electrode is produced. By connecting the above-mentioned voltages to the electrodes 22 and 33, a field between the electrodes 22 and 33 (from 33 towards 22) is obtained, so that the toner through the aperture 27 can be modulated. If the voltage of, eg. the signal electrode 22, is changed so that the field between the electrodes 22 and 33 changes direction, the aperture 27 is closed, ie. no toner particles are transferred from the toner carrier 14. By using a common back electrode 23 for all developers 10–13, all signal electrodes on a longitudinal line are connected to the same control signal and the toner carriers 14 are connected to different voltages by means of the switches 18*a*–18*d*.

Figures 6, 6A:
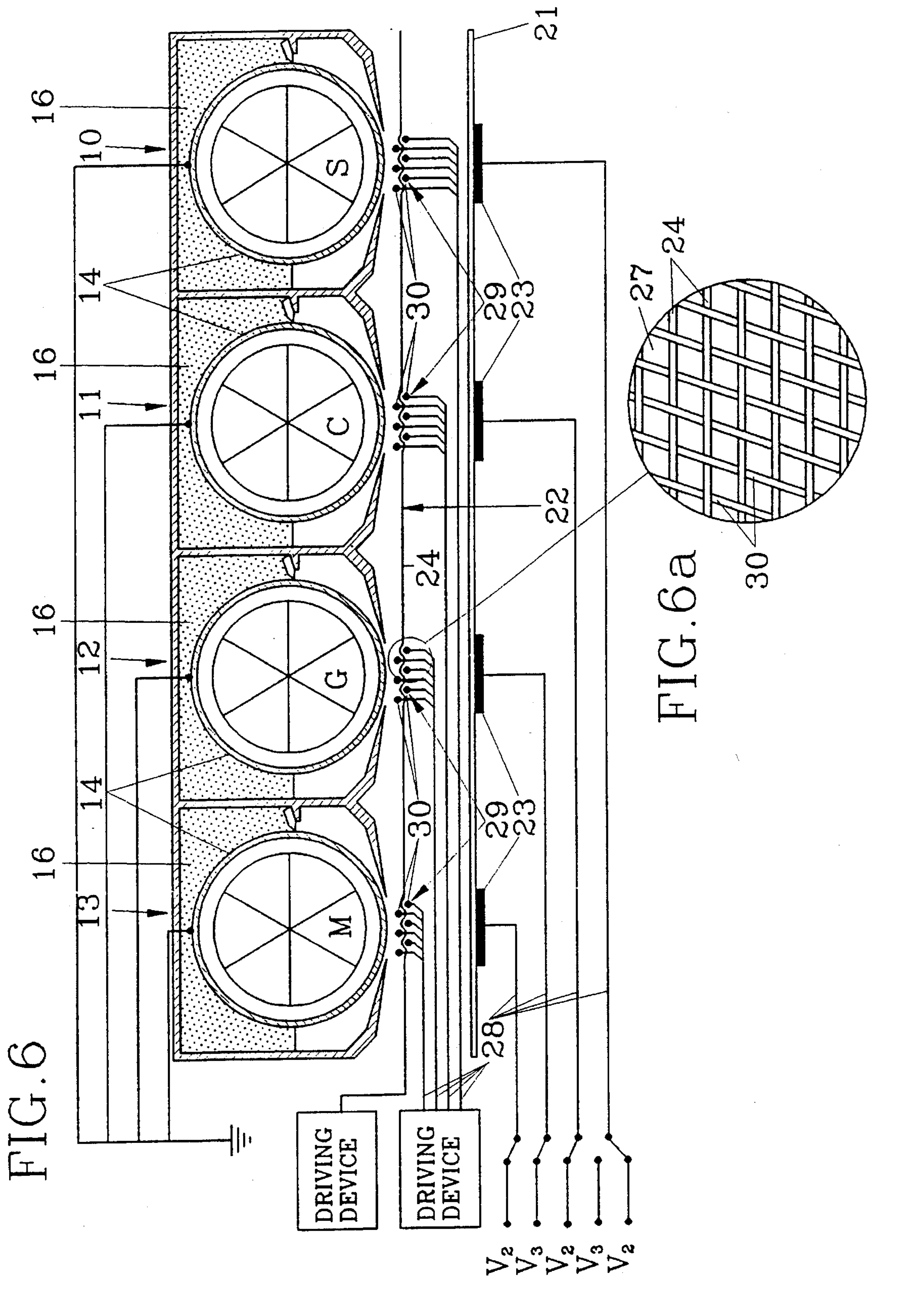

Those in FIG. 6 and 6*a* shown embodiments of electrode means 29, according to the invention, consist of inter-woven electrodes 24 and 30 forming an angle with each other, configuring a net with open meshes, which constitute said apertures 27. The information carrier 21 is located between the electrode means 29 and the back electrode 23. A number of driving devices 25 and 31 are provided to control the apertures 27 of the electrode means 29. Different colours are applied by the toner carriers 14 being commonly connected to, for instance earth and the back electrodes 23 to $V_2$ or $V_3$, at which connection to $V_2$ blocks the attraction forces between the back electrode and the toner carrier, while the connection to $V_3$ produces a field of force. By connecting the electrodes 24 to different voltages, ie. ON or OFF-voltages, passages in the electrode means 29 are opened, through which toner particles 16 are attracted to the information carrier 21. To obtain attraction through proper passage, a back electrode, arranged in front of the passage, is connected to potential ($V_3$) which produces an attraction force, while the other back electrodes are connected to other potential ($V_2$).

When generating images and text, different resolutions are used. A character, consisting of, eg. a number of black points, can have a lower resolution than an image consisting of, eg. different colours with higher dot density. According to the principal diagram in FIG. 7, the electrode means can consist of different numbers of apertures with varying sizes for different colours, for example area 35 is arranged with lower aperture density, eg. 150 dpi (dots/inch) for black toner particles and area 36 with higher aperture density, for example 300 dpi for toner particles of other colours. By reducing the number of signal conductors 28, which passes between the electrodes 24, ie. the shortest way to the next electrode group, also the production of the electrode means can be simplified. This method can also be applied when an electrode means of "particle modulator" type is used.

Figure 8:
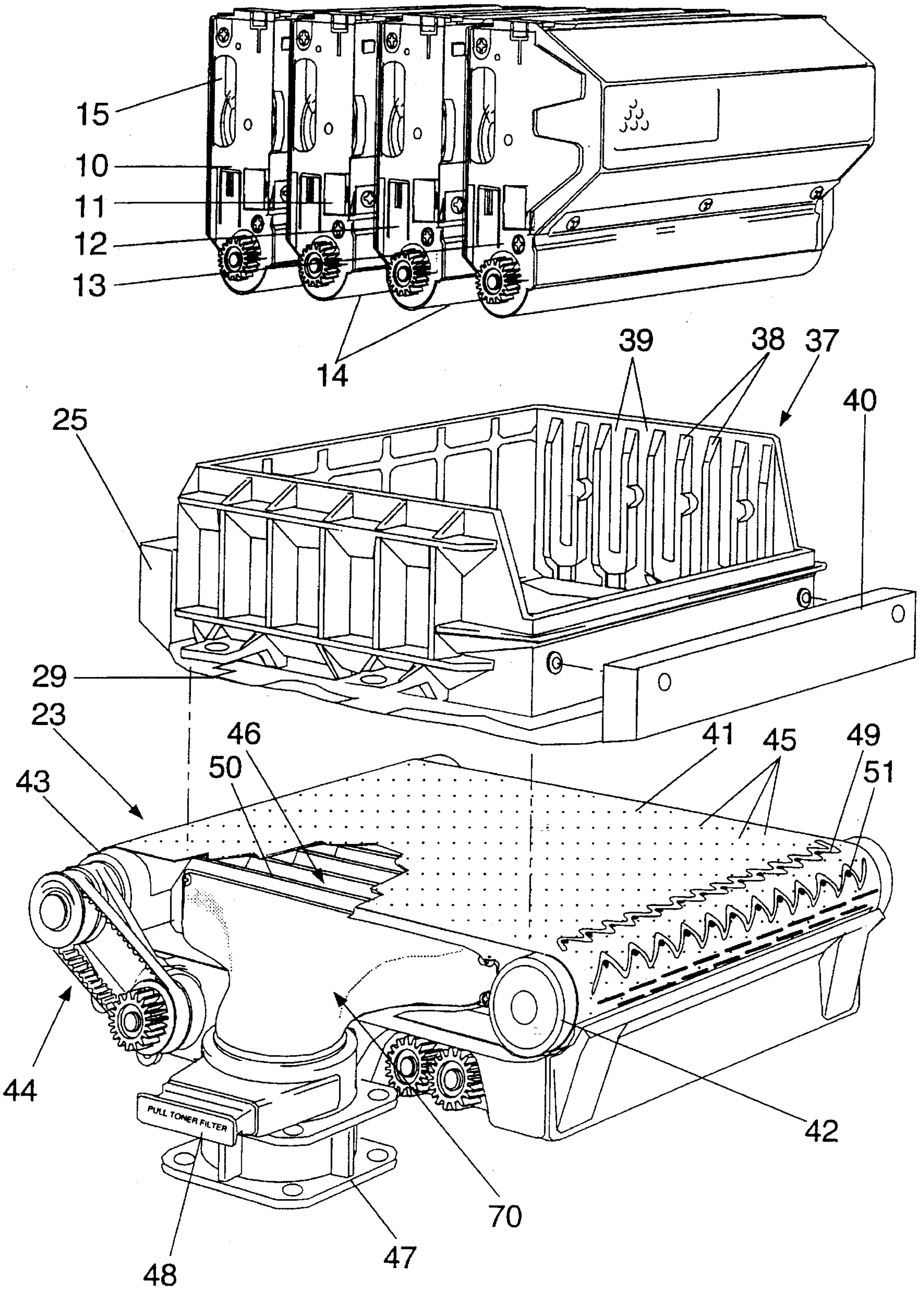

An embodiment of the developer units 10–13, comprising toner containers and particle carriers, are shown uppermost in FIG. 8. The developer units are mounted in a cartridge 37, having spacer means 38 and holders 39 with seats for holding the developer means 10–13 in correct distance relative each other and the electrode means 29. Channels are arranged for driving means, such as gearwheels, belts or the like (not shown), which drive the particle carriers of the developers 10–13.

The bottom portion of the cartridge 37 is open for exposing the particle carriers 14 to electrode means 29. Preferably, the electrode means 29 is arranged at the bottom portion of the cartridge 37, connected to a driving unit 25 and a retainer 40, which are arranged on both short ends of the cartridge.

According to this embodiment, the back electrode is arranged as a transport belt 41, comprised of flexible conductive or semi-conductive material suspended between two rotatable rollers 42 and 43, one of which is rotated by means of rotation devices 44.

The belt 41 is arranged with a plurality of pervious holes 45. Under the belt and between the rollers 42 and 43, a sucking or vacuum apparatus 70, comprising a chamber 46 and with this through a nozzle communicating fan 47 is arranged. A filter device 48 is provided in communication with the fan 47. The chamber 46 is provided with the grind smoothed bars 50.

Figure 9:
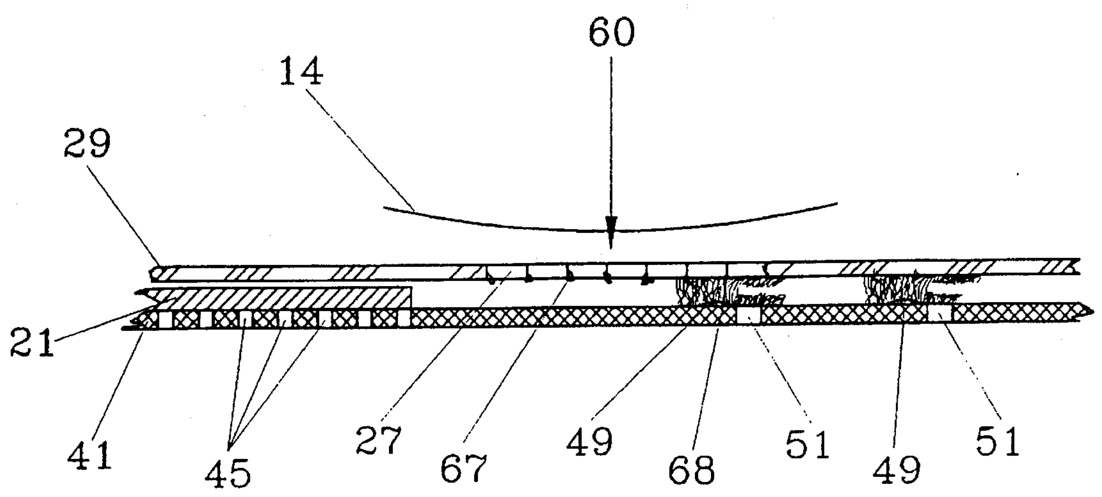
FIG. 9 shows schematically a part magnification of the paper sheet carrier/cleaning device, the electrode means and the toner carrier in cross-section.

All or some parts of the belt 41 are arranged with curved flock pads 49 of insulating or conducting material, which pads have larger holes 51 (compared to holes 45) at the curve points, preferably partly surrounded by pointed peak of the flock pad 49 in the belt movement direction, see FIG. 9.

The belt 41 has several functions. Besides operating as the back electrode, it is designed for conveying the information carrier, eg. paper sheet or the like, and cleaning the electrode means 29. When a paper sheet is delivered to the transport part of the belt having sucking holes 45, the paper sheet is fixed gradually on the belt by means of the sucking forces. The bars 50 support and attract the belt (and the paper), and due to the sucking the paper is attached to the belt with high precision, whereby the distance between the paper and the electrode means is determined exactly. The high precision attachment of the paper to the belt is desirable when the paper is conveyed a longer distance, where several colours are applied on the paper than in a monochromatic printer unit having only one developer.

The electrode means must be cleaned after each or several printing operations due to the congregation around the apertures of the electrode means by the toner particles. The congregation results in obstruction of the apertures 27 and deterioration of the printing quality.

Some coloured toner particles consist of material, having non or very little magnetic or electric properties, which means that cleaning the electrode means using, for example magnets will not work properly. By using the flock pads 49 on the belt 41, the adhesive toner particles 67 adhered to the electrode means 29 are brushed off and some wasted toners 68 are sucked to the chamber 46 via holes 51, as shown in FIG. 9. If conductive flock pads 49 are used, the surface of the electrode means 29 can be charged or neutralized by flock pads delivering charges.

The back electrode 23 in the belt 41 is energized through the bars 50, rollers 42 or 23, or by means of a sliding contact (not shown).

Figure 10:
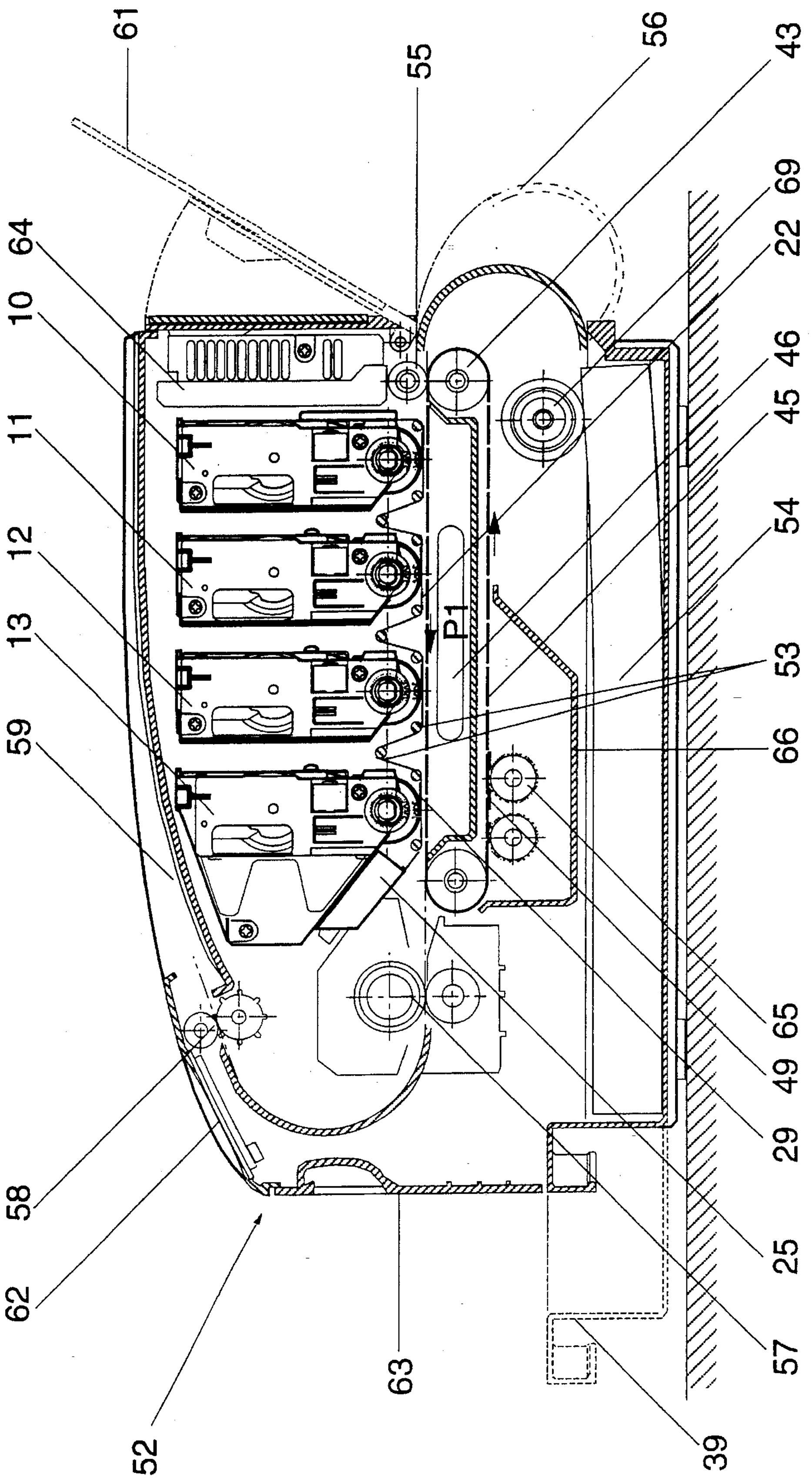
FIG. 10 shows a sectional view through a printer, including developers according to the invention.

A printer unit 52 shown in FIG. 10, comprises the developers 10–13, arranged in a developer compartment in the cartridge 37. The electrode unit 29, which in this case consists of flexible material, such as thin insulating film provided with conductive electrodes, is flexibly suspended by means of stretch/suspension means 53, to provide accurate distance to the back electrode and the particle carrier. The electrode means 29 is connected to driver means, ie. driver IC's 25. The printer 52 is provided with a detachable paper cassette, shown inserted in a space under the printer 52 in its working position and partly drawn out for loading with the paper (hatched lines).

A stack of paper 54 is so arranged that a friction pick up roller 69 feeds a paper sheet towards an U-shaped wall 56, which guides the paper sheet in front of a registration roller 55, which senses the presence of the paper sheet and by cooperation with the roller 43 guides the paper onto the combined belt and back electrode 23. In this embodiment the flock pads 49 are arranged only on one part of the belt, and a surface of the belt having suction holes 45 and having at least the same dimensions of the paper sheet is arranged to convey the paper. The paper sheet is transported by the developers 10–13, gradually under the electrode means, at which the desired toner colour is transferred on the paper. After toner transfer procedure the paper is guided through fusing means 57 and by the delivery rollers 58 to a paper delivery tray 59.

As shown in FIG. 9, after paper sheet output or during the printing, after paper sheet passing by each developer 10–13, the flock pads 49 pass by the electrode means 29, preferably in front of each developer and the remaining toner on the electrode means is brushed off, some adhered to the flocks of the flock pad and some sucked out to the vacuum chamber 46 and thus to the filter.

If the toner particles, which are used in the developers 10–13 have electrical or magnetic property, they can charge the surface of the electrode means and increase the adherence and disturb the transportation of the toner from the toner carrier onto the paper, the flocks can contain conductive material to charge or neutralize the surface of the electrodes and the adhesive toners in the print zone 60. One or more cleaning rollers 65 are arranged in communication with a toner waste container 66. When the flock pads 49 pass by the mentioned cleaning rollers 65, the toner particles adhered to the flocks are brushed off by means of the cleaning rollers 65 and the wasted toner is delivered to the container 66.

A manual feeding tray 61 is arranged to feed the paper sheet or the like manually. The functions of the printer unit 52 are controlled and displayed by means of a display and keyboard unit 62 arranged in front portion 63 of the printer. The power is supplied to the different parts by means of a power supply 64.

The invention is not limited to above described embodiments and other devices in the scope of claims can occur, for example the toner carrier can consist of gas- or airflows and the back electrode can be replaced with a conducting information carrier.

| List of referencal numbers | |
|---|---|
| 10–13 | developer |
| 14 | toner carrier, preferably a developer roll |
| 15 | toner container |
| 16 | toner particles |
| 17 | doctor blade |
| 18 | switching unit |
| 19 | opening in container |
| 20 | permanent magnet |
| 21 | information carrier |
| 22 | first electrode layer/direction |
| 23 | back electrode |
| 24 | electrode |
| 25 | driving device |
| 26 | insulating carrier |
| 27 | aperture |
| 28 | signal line |
| 29 | electrode means |
| 30 | transversal electrode |
| 31–32 | driving device |
| 33 | second electrode layer/direction |
| 34 | insulating layer |
| 35 | area with low aperture density |
| 36 | area with high aperture density |
| 37 | cartridge |
| 38 | spacer |
| 39 | holder |
| 40 | retainer |
| 41 | belt |
| 42, 43 | roller |
| 44 | rotation device |
| 45 | pervious hole |
| 46 | vacuum chamber |
| 47 | fan |
| 48 | filter |
| 49 | flock pad |
| 50 | bar |
| 51 | pervious hole |
| 52 | printer unit |
| 53 | suspension means |
| 54 | stack of paper |
| 55 | registration roller |
| 56 | guide wall |
| 57 | fusing means |
| 58 | feeding roller |
| 59 | paper delivery tray |
| 60 | print zone |
| 61 | manual paper feed tray |
| 62 | display and keyboard unit |
| 63 | front portion |
| 64 | power supply |
| 65 | cleaning roller |
| 66 | waste toner container |
| 67 | jammed toner |
| 68 | wasted toner |
| 69 | pick-up roller |
| 70 | vacuum/suction means |

I claim:

1. Device for generating multicolour images, by means of a latent electric charge pattern and development of this on an information carrier by means of toner particles of different colours, by using separate developers for each colour, which developers are individually provided with a toner carrier, preferably a conductive developer roller and at least one back electrode cooperative with this by means of attraction forces, and an electrode means arranged between these, having pervious apertures, which are opened and closed respectively by means of signals from at least a first driving device, characterized therein, that the electrode means includes at least a first electrode layer/direction, essentially including relative parallel individual electrodes, which are common for all developers, that the toner carriers and the back electrode are arranged to have applied a potential difference with respect to a colour selection, which results in attraction forces between the toner carrier and the back electrode, and that, optionally, the electrode means includes a second electrode layer/direction, which includes individual electrodes which are essentially parallel and formed at an angle to the first electrode layer/direction, and which are to be controlled individually by means of signals from at least a second driving device to open and close the pervious apertures.

2. Device according to claim 1, characterized therein, that each toner carrier is arranged to be connected separately to a voltage supply.

3. Device according to claim 1, characterized therein, that all toner carriers are arranged to have applied the same potential.

4. Device according to claim 1, characterized therein, that the potential of each individual electrode of the first electrode layer/direction and the second electrode layer/direction is selectively controllable, by means of said first and second driving devices for varying the size of the pervious apertures according to the signals generated by the first and second driving devices.

5. Device according to claim 1, characterized therein, that the electrode means are flexibly suspended by means of suspensions means relative to the toner carrier and the back electrode.

6. Device according to claim 1, characterized therein, that the back electrode is arranged as a movable belt.

7. Device according to claim 6, characterized therein, that said belt is provided with pervious holes communicating with a vacuum chamber connected to a vacuum producing means, and that the holes are arranged to suck and hold the information carrier on the belt.

8. Device according to claim 7, characterized therein, that said belt is arranged with cleaning means, which cleans the electrode means by brushing.

9. Device according to claim 8, characterized therein, that the cleaning means consist of flock pads.

10. Device according to claim 8, characterized therein, that cleaning means are provided for cleaning waste toner from said belt.

11. Device according to claim 7, characterized therein, that said belt is arranged with cleaning means which cleans the electrode means by sucking.

12. Device according to claim 7, characterized therein, that said belt is arranged with cleaning means which cleans the electrode means by supplying it with charges.

13. Device according to claim 7, characterized therein, that said belt is arranged with cleaning means which cleans the electrode means by brushing and sucking and supplying it with charges.

14. Device according to claim 1, characterized therein, that the developers are arranged in a carrier member, having spacer means, for accurate mounting of the developers.

15. Device according to claim 1, characterized therein, that the toner carrier includes gas flow.

16. Device according to claim 15, characterized therein, that the gas is air.

17. Device according to claim 1, characterized therein, that the number of apertures of the electrode means varies.

18. Device according to claim 1, characterized therein, that the electrode means are extended by means of suspension means relative to the toner carrier and the back electrode.

19. Device according to claim 1, characterized therein, that the electrode means are flexibly suspended and extended by means of suspension means relative to the toner carrier and the back electrode.

20. Device according to claim 1, characterized therein, that the size of the apertures of the electrode means varies.

21. Device according to claim 1, characterized therein, that the number of apertures and the size of the apertures of the electrode means varies.

22. Device for generating multicolour images, by means of a latent electric charge pattern and development of this on an information carrier by means of toner particles of different colours, by using separate developers for each colour, which developers are individually provided with a toner carrier in the form of a conductive developer roller, the information carrier being arranged as a back electrode which is cooperative with the toner carrier by means of attraction forces, and an electrode means arranged between these, having pervious apertures, which are opened and closed respectively by means of signals from at least a first driving device, characterized therein, that the electrode means includes at least a first electrode layer/direction, essentially including relative parallel individual electrodes, which are common for all developers, that the toner carriers and the information carrier are arranged to have applied a potential difference with respect to a colour selection, which results in attraction forces between the toner carrier and the information carrier, and that, optionally, the electrode means includes a second electrode layer/direction, which includes individual electrodes which are essentially parallel and formed at an angle to the first electrode layer/direction, and which are to be controlled individually by means of signals from at least a second driving device to open and close the pervious apertures.

* * * * *